June 19, 1923.
F. KRUSE
SAUSAGE TWISTING DEVICE
Filed July 10, 1922
1,459,065
2 Sheets-Sheet 1
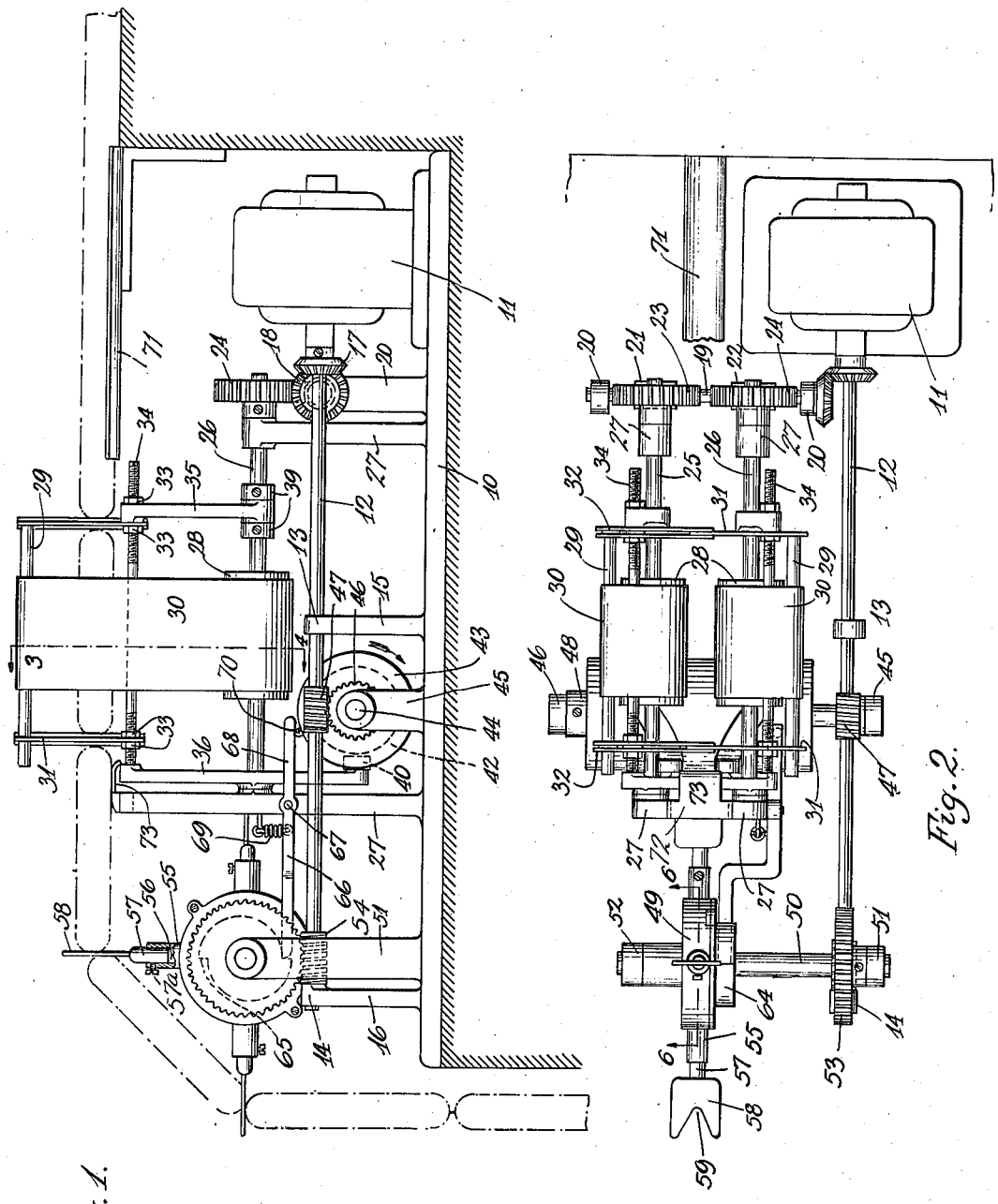
INVENTOR.
Ferdinand Kruse
BY Richards & Geier
ATTORNEYS.

June 19, 1923.

F. KRUSE

SAUSAGE TWISTING DEVICE

Filed July 10, 1922   2 Sheets-Sheet 2

1,459,065

INVENTOR.
Ferdinand Kruse.
BY Richards & Geier
ATTORNEY.

Patented June 19, 1923.

1,459,065

UNITED STATES PATENT OFFICE.

FERDINAND KRUSE, OF PORT RICHMOND, NEW YORK.

SAUSAGE-TWISTING DEVICE.

Application filed July 10, 1922. Serial No. 573,990.

*To all whom it may concern:*

Be it known that I, FERDINAND KRUSE, a citizen of the the United States, residing at Port Richmond, county of Richmond, and State of New York, have invented certain new and useful Improvements in Sausage-Twisting Devices, of which the following is a specification.

The principal object of this invention is to provide a sausage twisting machine of compact construction consisting of a small number of moving parts whereby the machine may be constructed and sold at a low price and will not entail a large maintenance of upkeep expense.

A further object is to provide a machine of this character which will be automatic in operation. Another object is to provide in combination with sausage twisting means, a means for feeding the sausages through the machine, and to so construct the feeding means that the sausage casing will not be subjected to undue strain or tension during the feeding movement.

Another object is to provide actuating means connected with and controlled by the main driving means and operating in timed relationship with the twisting means to intermittently feed the casing through the machine.

A further object is to provide means for automatically actuating the forming and twisting means simultaneously to compress the casing at selected points and to twist it when so compressed, and Another object is to provide means for adjusting the distance between the former elements to permit the casing to be twisted into links of various sizes.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a prefered embodiment of the invention, but it is to be understood that changes, variations and modifications may be resorted to which fall within the scope of the claims hereunto appended.

In the drawings forming a portion of this specification—

Fig. 1 is a side elevation of a machine embodying my invention.

Fig. 2 is a plan view of the machine shown in Fig. 1.

Figure 3:
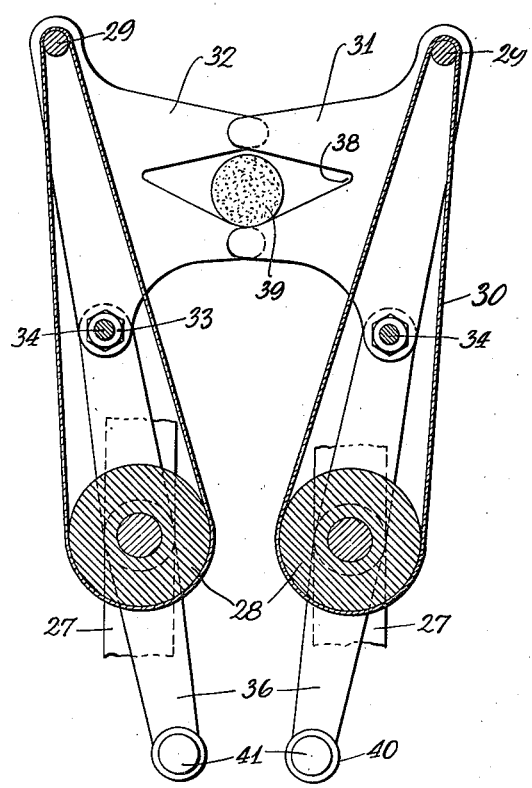
Figs. 3 and 4 are sectional views on the line 3—4 of Fig. 1, Fig. 3 showing the belts and formers in the open inoperative position and Fig. 4 showing the same parts in the closed or operative position.
Figure 4:
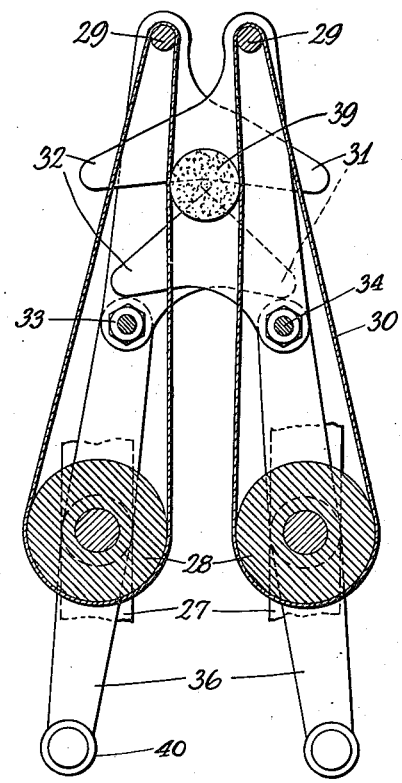

As shown in the drawings, the numeral 10 indicates the base of a stand or casting upon which the various parts are mounted, said stand having a motor 11 suitably secured thereto. The armature shaft of the motor is extended to form a main shaft 12, rotatably supported in the bearings 13 and 14 provided in the upper ends of the standards 15 and 16 respectively. A bevel gear 17 is secured upon the shaft 12, adjacent the inner end of the motor and meshes with a cooperating bevel gear 18 mounted on the end of a jack shaft 19 rotatably supported in the bearing brackets or standards 20 at right angles to the shaft 12. Secured upon the jack shaft 19, are the right and left hand of worms 21, 22, meshing with the worm gears 23, and 24 secured upon the ends of the shafts 25 and 26, respectively, the outer ends of the shafts 25, 26 being supported in the bracket 27. Secured upon the shafts 25, 26, to rotate therewith, are the belt driving rollers 28, about which and the upper idler rolls 29 are trained the twisting belts 30. The idler rolls 29 are supported by the upper ends of the former elements 31 and 32, which are adjustably secured as by the lock nuts 33 to the threaded rods 34 extending between the upper ends of brackets 35 and 36. The former element 31 consists of a single blade which is adapted to pass between a pair of similar spaced blades which comprise the former 32. All of the blades which are used for the formers are provided with a central V shaped notch 38 in which the sausage casing is adapted to be received, there being a pair of former elements situated adjacent each end of the belts 30.

A pair of brackets 35 are mounted adjacent the belts 30 at the feeding end of the machine, one member of the pair being mounted on the shaft 25, and the other upon the shaft 26, collars 39 being provided to prevent longitudinal movement of the brackets upon the shafts, upon which they are rotatably mounted. A pair of the brackets 36 are provided adjacent the delivery side of the belts 30, one member of the pair likewise being mounted upon the shaft 25 and the other upon the shaft 26. The brackets 36 which are also rotatably mounted upon the shafts extend downwardly below the shafts, and are provided at their lower ends with the rollers 40 which are rotatably mounted upon the pins 41 projecting laterally from the brackets, the rollers extending within the cam grooves 42 provided in the periphery of a cam roller 43 secured upon a cam shaft 44 journaled in the bearing brackets 45, 46. Secured to the cam shaft 44 adjacent the bracket 45 is a worm gear 46 meshing with a worm 47 secured upon the armature shaft 12, a collar 48 being secured upon the transverse shaft 44 adjacent the bracket 46 to prevent longitudinal movement of the shaft.

Figure 6:
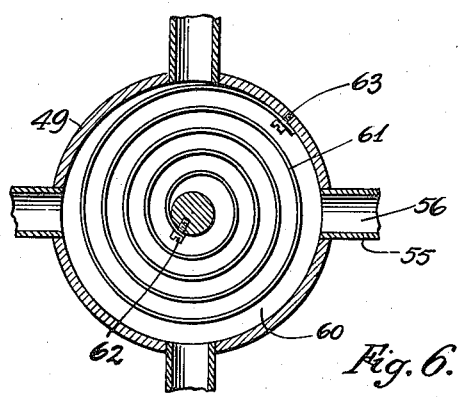
Fig. 6 is a section on the line 6—6 of Fig. 2.

Means are provided for drawing the sausage casing through the machine and comprises a spider 49 mounted upon a transverse shaft 50 journalled in the brackets 51, 52, a worm gear 53 being secured upon the shaft 50 to mesh with a worm 54 mounted upon the shaft 12. The spider 49 is provided with a plurality of radially extending arms 55, bored out as at 56 to receive the enlarged cylindrical ends 57 of the sausage feeding arms, the outer end of which terminate in the flattened portions 58 provided with a V shaped notch 59 to engage the sausages, screws 57ª being provided to adjust the arms 58 radially of the spider as desired. The spider 49 is hollow as indicated in Fig. 6, by the numeral 60, to form a housing in which is received the coiled spring 61, one end of which is secured as at 62 to the shaft 50, while the other end is secured as at 63 to the spider. A cam 64 having the stop shoulders 65 formed thereon is secured upon one face of the spider 49, and a lever 66 is pivoted intermediate its ends as at 67 upon one of the brackets 27, the outer end 68 of the lever being normally held in the path of the stop shoulders 65 by means of a coil spring 69 and the inner end of the lever being held by the spring in the path of a pin 70 projecting from the face of the cam 43.

Suitable supporting means are provided to sustain the weight of the casings in their passage through the machine and comprise the trough like structure 71 suitably supported at the delivery end of the machine at the proper height to deliver the sausage casings in proper alignment to the V shaped recesses 38, and a bridge piece 72 secured to the top of and extending across between the brackets 27, the bridge piece having a laterally projecting ear 73, to engage and support the sausages in their passage from the formers to the feeding or drawing spider 49 and associated parts.

Figure 5:
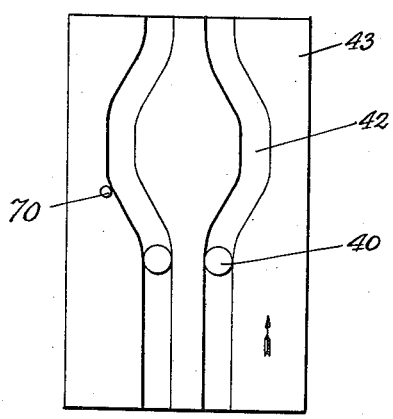
Fig. 5 is a development of the actuating cam for opening and closing the belts and formers, showing the relative position of the casing feed control pin.

The operation of the device is as follows: A sausage casing is threaded through the notches 38 and former elements 31, 32 while they are in the open position shown in Fig. 3, and the motor 10 is then started, causing the formers 31, 32 to be moved inwardly by action of the cam grooves 42 and brackets 36, and compress the sausage casing at the selected points. The location of the V notches with respect to the belts 30 is such that the formers will have compressed the sausage casing before the belts engage it for the twisting operation. The actuation of the motor causes the belts to turn in opposite directions through the gears 17, 18, 21, 22, 23 and 24, thereby twisting the casing as will be readily understood. The rotation of the main shaft 12 turns the shaft 50 through the gears 53, 54, rotating the spider 49 in a direction to cause the spring 61 to be wound up, the rotation of the spider being prevented by the engagement of the end of the lever 66 with the stop shoulder 65 of the cam 64. The location of the pin 70 with respect to the cam grooves 42 is such as shown in the cam development in Fig. 5 that the pin 70 will strike the end 68 of the lever 66 just as the cam groove causes the belts and formers to move outwardly to release the casing. The lever 66 being actuated to move out of engagement with the stop shoulder 65 just after the belts and formers are released, the spring 61 will cause the spider 49 to turn through a half revolution causing the arms 58 to draw the sausage casing through the machine, the length of the arms 58 being adjusted to move the casing an amount equal to two links. The spider is checked at the completion of its half revolution by the engagement of the lever 66 with the succeeding stop 65, the lever 66 being moved into the path of the shoulder by the spring 69. After the feeding movement of the sausage casing by the spider 49 and arms 58 is completed, the continued rotation of the cam 43 will again move the belts and formers into engagement with the casing, the operation continuing automatically without requiring any special care or attendance other than the initial threading of the casing into the machine and providing a continuous supply of stuffed casings. The casing is fed a distance equal to two links because it is obviously not necessary to twist every link the twisting of alternate links only being required. When it is desired to change the lengths of the links the lock nuts 33 and collars 39 are loosened and the formers 31, 32 and brackets 35 are moved to the desired points.

Having thus described my invention, what I claim as new and desire to secure by Letters Patent of the United States, is:—

1. In a sausage twisting machine, means to squeeze the sausages to divide them into spaced links, means to twist the casings to secure them in linked condition, said twisting means comprising a pair of cooperating pivotally mounted endless belts, adapted to be moved upon their pivots into and out of engagement with the sausage casings, and said squeezing means comprising a pair of former elements pivotally mounted adjacent the side edges of said belts, and a single means for actuating said former elements and belts into and out of engagement with the sausage casings.

2. In a sausage twisting machine, a pair of endless belts adapted to engage and twist a sausage casing, driving rolls for said belts, means for pivotally mounting said belts upon the axis of said driving rolls, former elements carried by said belt mounting means and means to actuate said belt mounting means to cause said belts and former elements to be moved into and out of engagement with the sausage casings.

3. In a sausage twisting machine, a pair of endless belts adapted to engage and twist the sausage casings, a driving shaft and a driving roll carried thereby for each of said belts, a pair of arms pivotally mounted on each of said driving shafts, each member of said pair of arms being located adjacent the side edges of said belts and in alignment with the corresponding arm on the adjacent driving shaft, a former element adjustably mounted on each of said arms and an idler roll extending between the former elements of each driving shaft.

4. In a sausage twisting machine, a pair of endless belts adapted to engage and twist the sausage casings, a driving shaft and a driving roll carried thereby for each of said belts, a pair of arms pivotally mounted on each of said driving shafts, each member of said pair of arms being located adjacent the side edges of said belts and in alignment with the corresponding arm on the adjacent driving shaft, a former element adjustably mounted on each of said arms and an idler roll extending between the former elements of each driving shaft, and means to move said arms about the axis of said driving shafts to cause said former elements and idler rolls to be moved to and from each other whereby the sausage casings will be squeezed by said former elements and the movement of idler rolls will carry said belts into and out of engagement with said casings.

5. In a sausage twisting machine, a pair of continuously operating endless belts adapted to engage and twist a sausage casing, former elements pivotally mounted adjacent the sides of the belt, means to cause said former elements and belts to successively move inwardly to engage said casing and outwardly to release said casing and spring actuated means to feed said casing intermittently through the machine.

6. In a sausage twisting machine, a pair of continuously operating endless belts adapted to engage and twist a sausage casing, former elements pivotally mounted adjacent the sides of the belt, means to cause said former elements and belts to successively move inwardly to engage said casing and outwardly to release said casing, spring actuated means to feed said casing intermittently through the machine, and means operating in timed relationship with said first mentioned means to release said spring actuated means when said belts and formers have released the casing.

7. In a sausage twisting machine a pair of pivotally mounted endless belts adapted to engage and twist a sausage casing, former elements pivotally mounted adjacent the sides of the said belts, a main shaft, a jack shaft, driven by said main shaft, means carried by said jack shaft for driving said belts, a cam shaft driven by said main shaft, and cam means mounted on said cam shaft adapted to actuate said formers and belts upon their pivots to engage the sausage casing.

8. In a sausage twisting machine, a pair of pivotally mounted endless belts adapted to engage and twist a sausage casing, former elements pivotally mounted adjacent the sides of said belts, a main shaft, a jack shaft, driven by said main shaft, means carried by said jack shaft for driving said belts, a cam shaft driven by said main shaft, cam means mounted on said cam shaft adapted to actuate said formers and belts upon their pivots to engage the sausage casing, means to intermittently feed the casings through the machine and means carried by said cam means to control said feeding means.

9. In a sausage twisting machine, a pair of pivotally mounted endless belts adapted to engage and twist a sausage casing, former elements pivotally mounted adjacent the sides of said belts, a main shaft, a jack shaft driven by said main shaft, means carried by said jack shaft for driving said belts, a cam shaft driven by said main shaft, cam means mounted on said cam shaft adapted to actuate said formers and belts upon their pivots to successively engage and release the sausage casing, means to intermittently feed the sausage casing through the machine and means carried by said cam means to control said feeding means and permit it to be actuated only when said casing has been released by said belts and formers.

10. In a sausage twisting machine, a pair of pivotally mounted endless belts adapted to engage and twist a sausage casing, former elements pivotally mounted adjacent the sides of said belts, a main shaft, a jack shaft driven by said main shaft, means carried by said jack shaft for driving said belts, a cam shaft driven by said main shaft, cam means mounted on said shaft, adapted to actuate said formers and belts upon their pivots to successively engage and release said casing, a feeding device, a spring to actuate said feeding device, means driven by said main shaft to wind said spring, means to prevent actuation of said spring, and means carried by said cam means to actuate said last mentioned means and release said spring whereby said feeding device will be actuated in predetermined timed relationship with said belt and former opening and closing means.

11. In a sausage twisting machine, a pair of endless belts adapted to engage and twist a sausage casing, former elements pivotally mounted adjacent the sides of said belts, means to adjust the distance between said former elements and a feeding device adapted to engage and feed said casing through the machine comprising a spider having a plurality of radially extending arms having sausage engaging notches at their outer extremities, said radially extending arms spaced to engage said casing at alternate links thereof.

12. In a sausage twisting machine, a pair of endless belts adapted to engage and twist a sausage casing, former elements pivotally mounted adjacent the sides of said belts, means to adjust the distance between said former elements and a feeding device adapted to engage and feed said casing through the machine comprising a spider having a plurality of radially extending arms having sausage engaging notches at their outer extremities, said radially extending arms spaced to engage said casing at alternate links thereof, and means to adjust said arms radially to compensate for various adjustments of said former elements.

13. In a sausage twisting machine, a pair of endless belts adapted to engage and twist a sausage casing, former elements pivotally mounted adjacent the sides of said belts, means to adjust the distance between said former elements and a feeding device adapted to engage and feed said casing through the machine comprising a spider having a plurality of radially extending arms, having sausage engaging notches at their outer extremities, spring actuated means to rotate said spider, and means to control said spring actuated means to cause the same to feed the sausage casing at predetermined intervals.

14. In a sausage twisting machine, a pair of endless belts adapted to engage and twist a sausage casing, former elements pivotally mounted adjacent the sides of said belts, a main shaft, means driven by said main shaft to rotate said belts, a feeding device adapted to engage and feed the casing through the machine comprising a transverse shaft driven by said main shaft, a spider rotatably mounted on said shaft, spring means interposed between said spider and transverse shaft adapted to be wound up by rotation of said shaft, means to normally prevent rotation of said spider and means to release said last mentioned means at predetermined intervals to permit rotation of said spider.

15. In a sausage twisting machine, a pair of endless belts adapted to engage and twist a sausage casing, former elements pivotally mounted adjacent the sides of said belts, a main shaft, means driven by said main shaft to rotate said belts, a feeding device adapted to engage and feed the casing through the machine comprising a transverse shaft driven by said main shaft, a spider rotatably mounted on said shaft, spring means interposed between said spider and transverse shaft adapted to be wound up by rotation of said shaft, spaced stops carried by said spider, a pivoted lever projecting into the path of movement of said stops, means to normally hold said lever into engagement with a stop, and means to move said lever at predetermined intervals out of engagement with said stop to permit a limited rotation of said spider.

16. In a sausage twisting machine, a pair of pivotally mounted endless belts adapted to engage and twist a sausage casing, former elements pivotally mounted adjacent the sides of said belts, means to drive said belts, cam means to actuate said belts and former elements about their pivotal mountings to alternately engage and release the sausage casing, and a feeding device adapted to intermittently move said casing through the machine when said casing is released comprising a rotatably mounted spider, spring means to rotate said spider, means to normally hold and prevent said spring means from rotating said spider and means carried by said cam means to release said spring holding means and permit rotation of said spider.

17. In a sausage twisting machine, a pair of endless belts between which a sausage casing is adapted to be engaged and twisted, a cooperating pair of former elements mounted adjacent the side edges of said belts, means for continuously operating said belts, means to cause said belts and former elements to be moved into and out of engagement with the sausage casing, a feeding device to carry said casing between said belts and former elements, means to intermittently actuate said feeding device, means to adjust the distance between said former elements for different lengths of sausage links and means to adjust said feeding device to compensate for the adjustment of said former elements, without changing the driving speed of the means for actuating said feeding device.

In testimony whereof I have affixed my signature.

FERDINAND KRUSE.